No. 874,347.

PATENTED DEC. 17, 1907.

D. LANGE.
MATCH SCRATCH AND RECEPTACLE.
APPLICATION FILED JUNE 19, 1907.

2 SHEETS—SHEET 1.

Witnesses
C. H. Walker,
E. G. Mason

Inventor
Diego Lange.
By Geo. H. Evans
Attorney

No. 874,347.
PATENTED DEC. 17, 1907.
D. LANGE.
MATCH SCRATCH AND RECEPTACLE.
APPLICATION FILED JUNE 19, 1907.
2 SHEETS—SHEET 2.
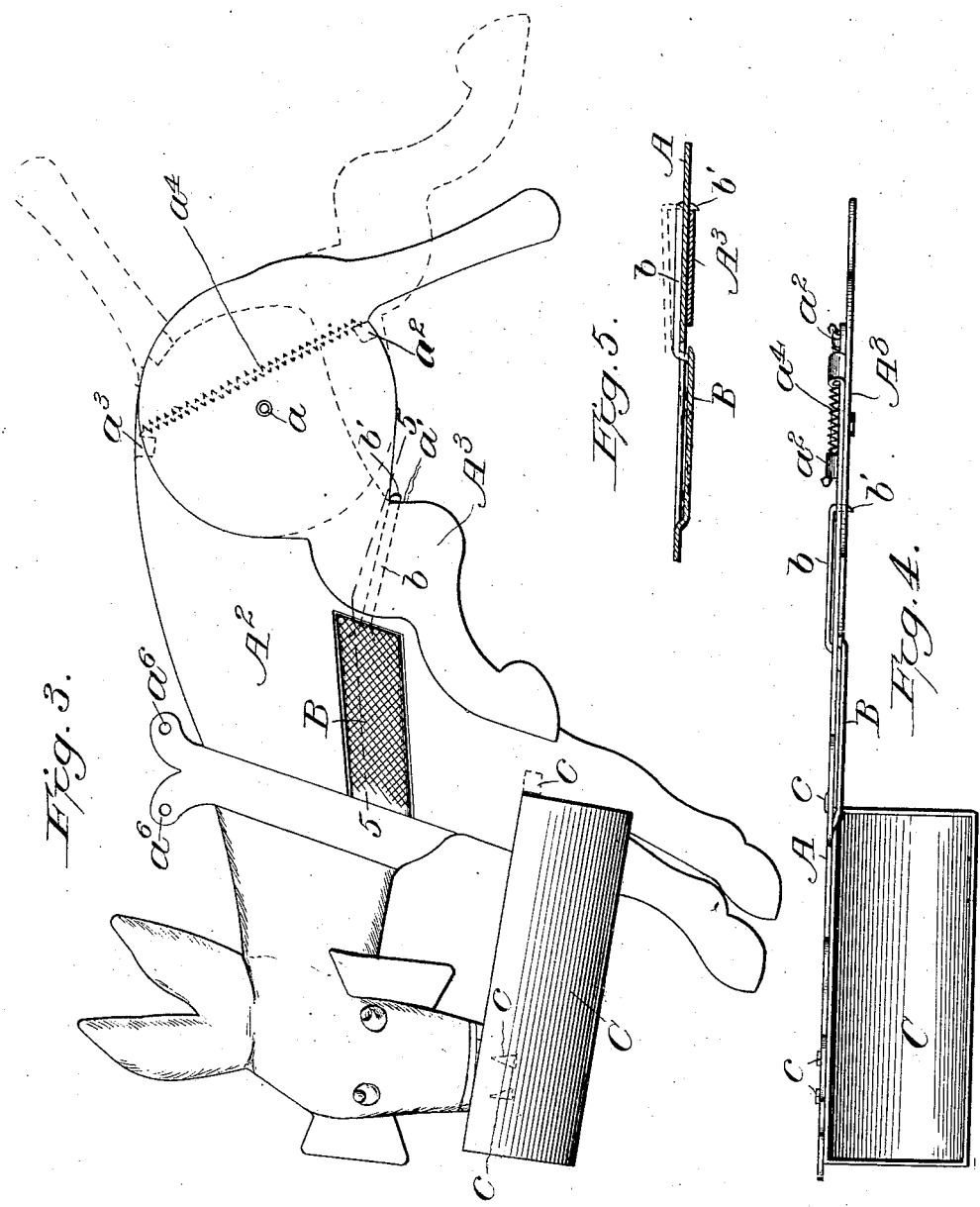
Witnesses
C. N. Walker
E. G. Mason
Inventor
Diego Lange
by Geo. N. Evans
Attorney

UNITED STATES PATENT OFFICE.

DIEGO LANGE, OF LA CROSSE, WISCONSIN.

MATCH SCRATCH AND RECEPTACLE.

No. 874,347.  Specification of Letters Patent.  Patented Dec. 17, 1907.

Application filed June 19, 1907. Serial No. 379,759.

*To all whom it may concern:*

Be it known that I, DIEGO LANGE, a citizen of the United States, residing at La Crosse, in the county of La Crosse and State of Wisconsin, have invented certain new and useful Improvements in Match Scratches and Receptacles, of which the following is a specification.

My invention relates to match safes and particularly to the scratch or strike thereof.

The object of the invention is to provide the figure or representation of an animal with a spring projected member adapted to be held retracted by a scratch or strike so that when a match is struck upon the scratch or strike, the said member will be released and projected by its spring.

Figure 1:
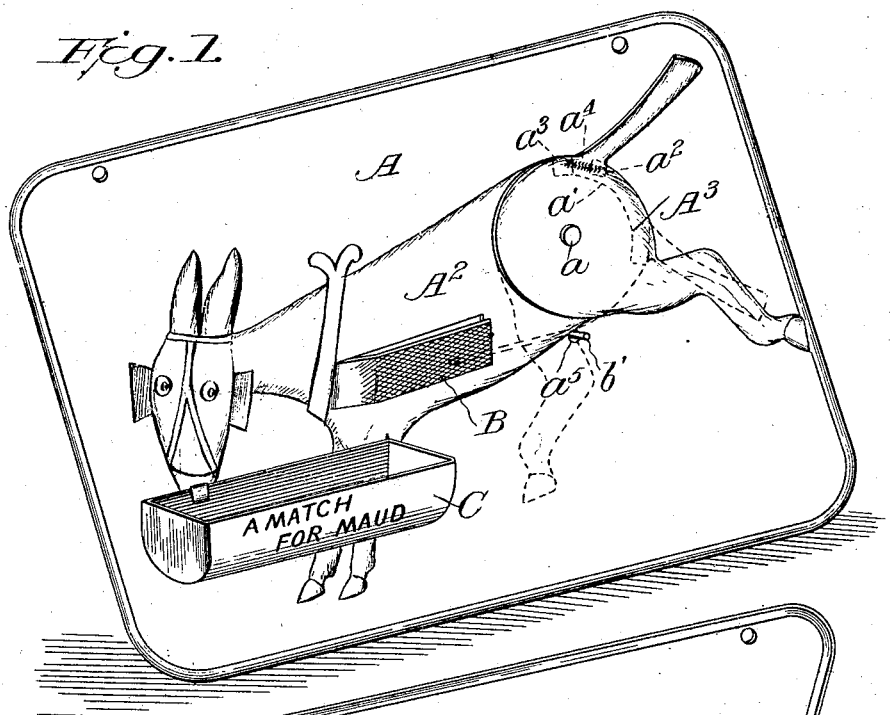
Figure 2:
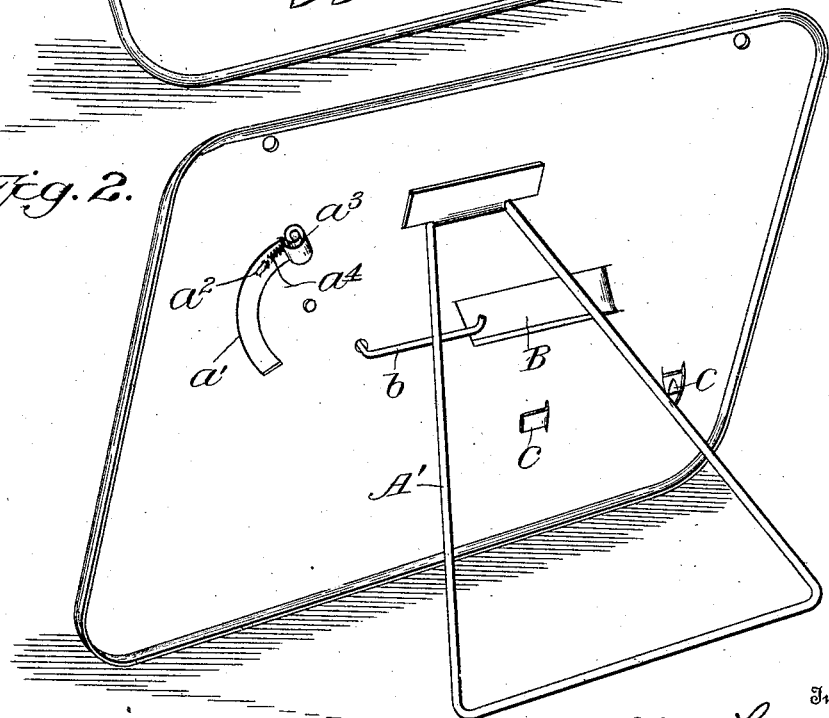

The animal figure is preferably that of a mule having its hind leg pivoted and provided with a spring and the scratch is yielding and provided with a catch to hold the leg retracted till a match is struck. This object I accomplish by the construction shown in the accompanying drawings in which, Figure 1 is a front perspective of a match safe with my improvements applied. Fig. 2 is a rear perspective. Fig. 3 is a front elevation showing a modified form. Fig. 4 is a top plan view. Fig. 5 is a sectional view on the line 5—5 of Fig. 3.

A designates a panel preferably of sheet metal and provided with a hinged support A' at its rear side. Upon the panel is provided in any suitable way, the figure of an animal A² preferably that of a mule, and the movable member is preferably in the form of one of the animal's hind legs A³, which is pivoted at $a$.

The panel A is provided beneath the leg A³ with a curved slot $a'$ through which extends a lug or eye $a^2$ secured to or formed on the rear of the pivoted leg. The metal cut in forming the slot $a'$ is rolled up to form a fixed lug or eye $a^3$ and a spring $a^4$ connects these lugs so that it will be under tension when the leg is swung forwardly.

B, is the scratch which has the appearance of being one of the hame tugs and it is formed by punching up from the body of the panel or animal a tongue like piece, which is free at its rear end. From the rear end of the scratch extends a catch $b$, having a forward bend or toe $b'$ which projects through an aperture $a^5$, so that the leg A³ will be engaged at its rear edge by said catch and held until a match is struck on the scratch B, whereupon the scratch will be pressed inwardly and carry with it the catch so that the leg will be released and kick or fly back under the influence of its spring.

The match receptacle C is connected at its rear edge by tongues $c$, $c$, at points co-inciding with the mouth and fore legs of the animal.

In Figs. 3 to 5, substantially the same construction is shown except that the figure of the animal is cut out and not produced on a panel as in Fig. 1, the curved slot $a'$ is also omitted, and attaching apertures $a^6$ are provided at the upper ends of the hames in lieu of the prop or support A'.

What I claim is:—

1. A match scratch or strike comprising, a figure of an animal having a movable limb or member, means for projecting the member, and a movable scratch having a catch to hold the said limb or member retracted until said scratch is struck as in the act of striking a match.

2. A match scratch or strike comprising, the figure of an animal having a pivoted hind leg, a spring for projecting the leg, and a yielding scratch having a catch in the path of the leg to hold it retracted against the action of the spring until the scratch is struck as in the act of striking a match.

3. A match scratch or strike comprising, the figure of an animal having a pivoted hind leg, a spring for projecting the leg, and a tongue like scratch struck up from the body of the animal and having a catch member projecting beyond the front side of the figure in the path of the leg to hold it retracted against the force of the spring until the scratch is pressed inwardly as in the act of striking a match.

4. A match scratch comprising, a panel bearing the figure of an animal, a pivoted hind leg therefor, a spring for projecting the leg, and a scratch punched out from the body of the animal and having a catch in the path of the leg to hold it retracted against the action of said spring until the scratch is pressed inwardly as in the act of striking a match.

5. A match scratch comprising, a panel bearing the figure of an animal provided with a pivoted hind leg, the panel having a curved slot covered by said leg, the material punched out in forming the slot in turn forming a lug or projection, a lug or projection extending from the pivoted leg through said slot, a spring connecting said two lugs or projections, and a scratch or strike punched from the body of the animal and having a catch to hold the pivoted leg retracted against the action of the spring until said scratch is struck as in the act of lighting a match.

6. A match receptacle and scratch comprising, the figure of an animal, a spring projected pivoted hind leg therefor, a scratch punched up from the body of the material and having a catch to hold the said leg retracted until the scratch is struck as in the act of lighting a match, and a match receptacle secured to the fore end of the figure.

7. A match receptacle and scratch comprising, a panel, a support therefor, a figure of an animal on the panel, a pivoted hind leg for the animal, a spring for projecting said leg, a punched up scratch having a catch for holding the leg retracted against action of the spring, a match receptacle and interlocking slots and projections connecting said receptacle to the fore end of the figure.

In testimony whereof I affix my signature, in presence of two witnesses.

DIEGO LANGE.

Witnesses:
  D. S. LAW,
  MARION G. ANDERSON.